United States Patent

St. Jean

[15] 3,702,392
[45] Nov. 7, 1972

[54] METHODS FOR VERIFYING THE IDENTITY OF A CARD HOLDER AND APPARATUS THEREFOR

[72] Inventor: Lloyd E. St. Jean, Huntington, Long Island, N.Y.

[73] Assignee: Interface Industries, Inc.

[22] Filed: Nov. 20, 1970

[21] Appl. No.: 91,504

[52] U.S. Cl. ..........................235/61.7 B, 340/149 A
[51] Int. Cl. ................................................G06k 7/00
[58] Field of Search ..........235/61.7 B, 61.11; 179/2; 340/149 A, 146.1

[56] References Cited

UNITED STATES PATENTS

| | | | |
|---|---|---|---|
| 3,588,449 | 6/1971 | Paterson | 235/61.7 B |
| 3,184,714 | 5/1965 | Brown | 235/61.7 B UX |
| 3,308,238 | 3/1967 | Brothman | 179/2 |
| 3,514,754 | 5/1970 | Schaend | 340/149 A |
| 3,513,298 | 5/1970 | Riddle | 235/61.11 |
| 3,221,304 | 11/1965 | Enikeieff | 340/149 A |
| 3,401,830 | 9/1968 | Mathews | 235/61.7 B UX |
| 3,453,598 | 7/1969 | Schweizer | 235/61.7 B UX |

*Primary Examiner*—Thomas A. Robinson
*Attorney*—Marn & Jangarathis

[57] ABSTRACT

Methods and apparatus for verifying the identity of a bearer of a card having a plural digit identifying number and an associated security code are provided in accordance with the teachings of the present invention. Each card holder is assigned a security code by the card issuer and such security code is associated with certain digits of the plural digit identifying number on the card issued. In one embodiment of the present invention a card which is presented is verified by apparatus which acts to accept the security code presented by the bearer thereof, generate the security code associated with certain digits of the plural digit identifying number on the card presented and to compare the security code generated with that presented. Thereafter an indication is provided as to whether or not the card presented should be accepted based on a successful or unsuccessful comparison operation.

23 Claims, 3 Drawing Figures

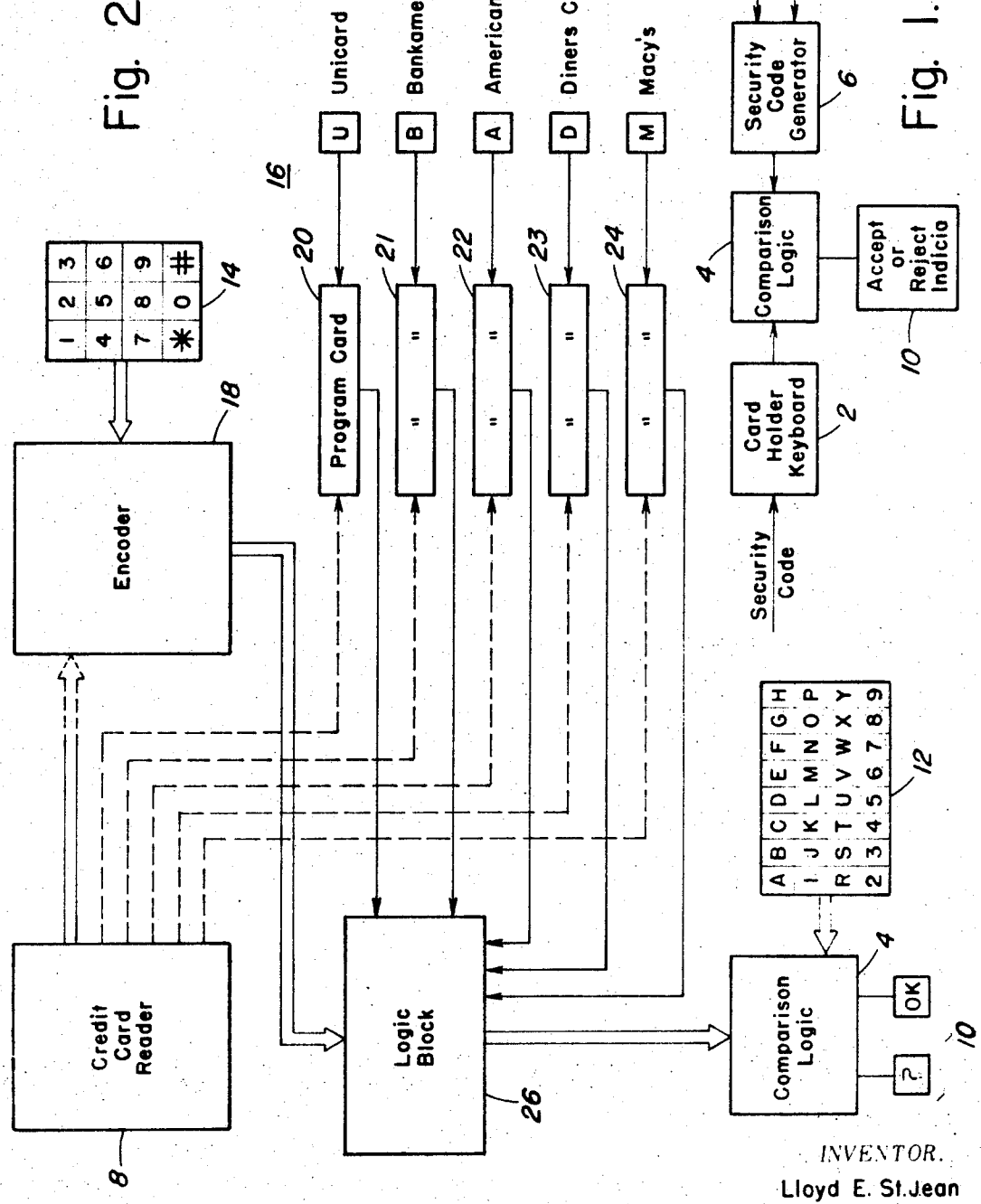

3,702,392

METHODS FOR VERIFYING THE IDENTITY OF A CARD HOLDER AND APPARATUS THEREFOR

This invention relates to bearer identification methods and apparatus and more particularly to methods and apparatus for verifying that the identity code presented by a bearer of a credit card, security card or the like is the same as that associated with such card.

The wide proliferation of credit cards by large numbers of commercial institutions and their attendant use by large segments of the population has led to wide trafficking in stolen credit cards to the extent that vendors of goods or services may no longer be confident that a bearer of a credit card is the person to whom it was issued or another authorized user thereof. However, as credit cards enable the direct preparation of computer compatible account records, act as an attractive substitute to carrying large sums of currency and enable so called instant credit; their proliferation and use has not been diminished by such trafficking but instead large losses due to the unauthorized use of such credit cards have been incurred. Thus, a clearly defined need has arisen for apparatus capable of rendering a threshold decision as to whether or not the bearer of a credit card is an authorized user thereof.

In addition, as the familiar credit card arrangement provides a highly convenient format for current state of the art security systems, encoded cards of this type often function as an access device for apparatus that may be supplied with electronic locks such as bank vaults, file cabinets, government security areas, residential doors, automobile ignition locks and similar devices. Here too, as a threshold determination as to the appropriate identity of the card bearer is virtually essential to the proper operation of such current state of the art security systems, a clearly defined need for apparatus for automatically rendering such threshold determination to thereby validate the card and holder at the instant of use is a virtual necessity.

Furthermore, as a large amount of digital information may be nonviewably encoded on a card similar in form to the conventional credit card format, cards of this type will soon be available for purposes which are wholly unrelated to either a credit or security function. For instance, identification cards may be developed upon which are encoded in machine readable form an individual's birth certificate information, physical characteristics, social security number, service record, employer's identification, employee's number, residential telephone number, life insurance policies, next of kin information, fingerprint classification number and/or any other form of suitable identifying data with which he may periodically have to identify himself. Similarly, the various state motor vehicle bureaus could issue driver's licenses in this form, wherein coding techniques are relied upon to place all of the required information on the credit card format, in machine readable form, together with limitations and restrictions on the license due to physical disabilities and the like. Drivers' licenses of this type would be highly advantageous because they could be combined with a secondary electronic ignition lock on a vehicle so that such vehicle could only be operated with a valid license in place. In fact, as current state of the art encoding techniques are capable of recording over one thousand characters in 18 lines on the area of a standard credit card and work now in progress indicates that at least 3,000 characters in 36 lines should be available in the near future, it is entirely conceivable that a single, penultimate, credit type card could be used for a plurality of individual functions. For instance, a penultimate credit card could presently be developed wherein license information could be provided using 150 characters, personal identification data could be provided using 200 characters, medical history could be provided using 350 characters and ten credit accounts could be provided using 300 characters. However, regardless of the function or functions of the card being considered, apparatus capable of verifying the identity of the user would be required in each case to ensure that the bearer is not attempting to perpetrate a fraud and as the number of functions associated with a given card increased; the risk of fraud and hence the need for initially validating the identify of the card bearer prior to each use thereof would also increase.

As the need for verifying the identity of the bearer of a credit or similar cards of this nature prior to the acceptance thereof in a payment or in an access situation has become manifest, various schemes have been developed so that a party to whom such card is presented may make some form of initial determination as to the requisite identity of the bearer of such card. The earliest system to be devised and the one still most commonly used in conjunction with credit cards is that of providing a signature specimen of the authorized credit card holder directly on the credit card itself so that the party to whom it is presented may make a direct comparison of the specimen on the credit card with a charge slip that the bearer of the credit card is asked to sign. However, since a signature may be easily reproduced by parties interested in perpetrating a fraud and not every person in the position of accepting a credit card can reasonably be expected to be a handwriting expert; this system has had relatively minor success and is rapidly falling into disuse. Furthermore, the signature form of a verifying system can have no application in cases where an acceptance device rather than an individual is used. Other systems have been devised wherein a specialized credit card, bearing viewable or non-visible, independent identifying indicia or codes in the form of markings, holes, magnetic embedments or the like are used in conjunction with verifying apparatus which act to optically or magnetically read the code and compare the code associated with such specialized credit card with an identifying code presented by the bearer. These systems assume ab initio that the independent identifying code associated with each specialized credit may not be readily derived by a person interested in perpetrating a fraud; however, due to the specialized nature of the credit card utilized this is often not the case because a familiarity with the systems used can often lead to a capability to decode or derive the independent code present on a specialized card especially if the right equipment is available. However, the biggest single drawback associated with the use of verifying systems of this variety is the use of the specialized card itself because it would require the issuers of such cards to go to the expense of issuing all new cards whose individual cost is generally much greater than that normally associated with the credit cards traditionally used, the various credit card issuing concerns would have to uniformly adopt the same system so that each facility accepting them would not have to possess different verifying apparatus for each system adopted by each credit issuer if in fact one system could accommodate the large number of accounts issued by all of these concerns, and the various types of card designations employed by each credit card issuing concern would have to be conformed to a standardized arrangement which would be compatible with the system selected. However, as the large expense required by the adoption of these systems tends to be prohibitive and the adoption of a standardized system among competitors may not be easily accomplished, verifying systems of the foregoing type are not considered to be highly advantageous despite the solution posed to the foregoing problems. Of course, each credit card issuer could adopt its own verifying system and a specialized card associated therewith; however, under these conditions each location accepting more than one variety of credit card would require a plurality of types of verifying devices capable of reading each type of card and the prohibitive costs and low security associated with the specialized card formats would remain.

Therefore, it is an object of this invention to provide methods and apparatus for verifying the identity of a bearer of a credit card or the like which methods and apparatus are completely compatible with conventional credit card formats having no special encoding of identifying codes thereon.

It is a further object of the present invention to provide a method of verifying the identity of a holder of a credit card or the like and apparatus therefor wherein an authorized holder is assigned a simple identity code which is compared upon the presentation of such credit card with an identity code associated with the account number or another similar number on a credit card and machine derivable therefrom.

It is another object of this invention to provide methods and apparatus for performing identification or verification of the bearer of a credit card or the like independently of whether or not the credit card is machine readable or readable merely upon an inspection thereof.

It is an additional object of this invention to provide methods and apparatus for validating the identity of a bearer of a credit card or the like wherein the account digits or a similar number on the face of the credit card or machine readable therefrom are used for the generation of an identity code associated with that card, which identity code may differ for cards issued by different concerns even though the account numbers used thereby are the same.

It is another object of this invention to provide methods and apparatus for verifying the identity of a bearer of a credit card or the like wherein apparatus is provided which is compatible with a large number of credit cards issued by different concerns and each concern issuing credit cards which are compatible therewith may change the identity codes associated with the credit cards issued thereby independently of the other credit card issuers using such apparatus and without changing the credit cards already issued.

It is a further object of this invention to provide methods and apparatus for validating the identity of a bearer of a credit card or the like wherein an identity code assigned to the authorized bearer and that associated with the account number of the card are compared and an indication as to the result of such comparison is provided without the identity code being indicated or otherwise being directly or indirectly disclosed.

Other objects and advantages of the instant invention will become clear from the following detailed description of an exemplary embodiment thereof, and the novel features will be particularly pointed out in conjunction with the appended claims.

Although the present invention will be described in reference to conditions which normally obtain when a card of the credit card variety is presented in payment for goods or services rendered, it will be appreciated that the methods and apparatus disclosed herein will be fully applicable to validating any card or other token bearing an account number or similar indicia which is used for credit purposes, access to a security system, the actuating of lock devices or any other identification purposes. Furthermore, although the cards discussed hereinafter will be referred to principally as credit cards, due to the image which this terminology immediately conveys, it will be appreciated by those of ordinary skill in the art that the instant invention may be employed with and is directly applicable to cards of this format or other similar indicia means used for any purpose such as those briefly mentioned above.

In accordance with this invention methods and apparatus for verifying the identity of a bearer of a credit card or the like is provided wherein each card holder is assigned an identity or security code by the card issuer, such identity or security code being then associated with certain digits of the account number of the card being issued; verifying apparatus is provided which acts to accept a bearer's identity or security code, generate the identity or security code associated with certain digits of the account number of the card presented, and to compare the code generated with a representation of the identity or security code supplied by the bearer of the card; thereafter such verifying apparatus indicates whether or not the card presented should be accepted based upon a successful or unsuccessful comparison operation.

The invention will be more clearly understood by reference to the following detailed description of an embodiment in conjunction with the accompanying drawings in which:

FIG. 1 is a generalized block diagram serving to schematically illustrate the major components of an exemplary embodiment of verification apparatus according to the present invention;

FIG. 2 is a flow diagram illustrating the logical operation of the embodiment of the verification apparatus depicted in FIG. 1.

Figure 3:
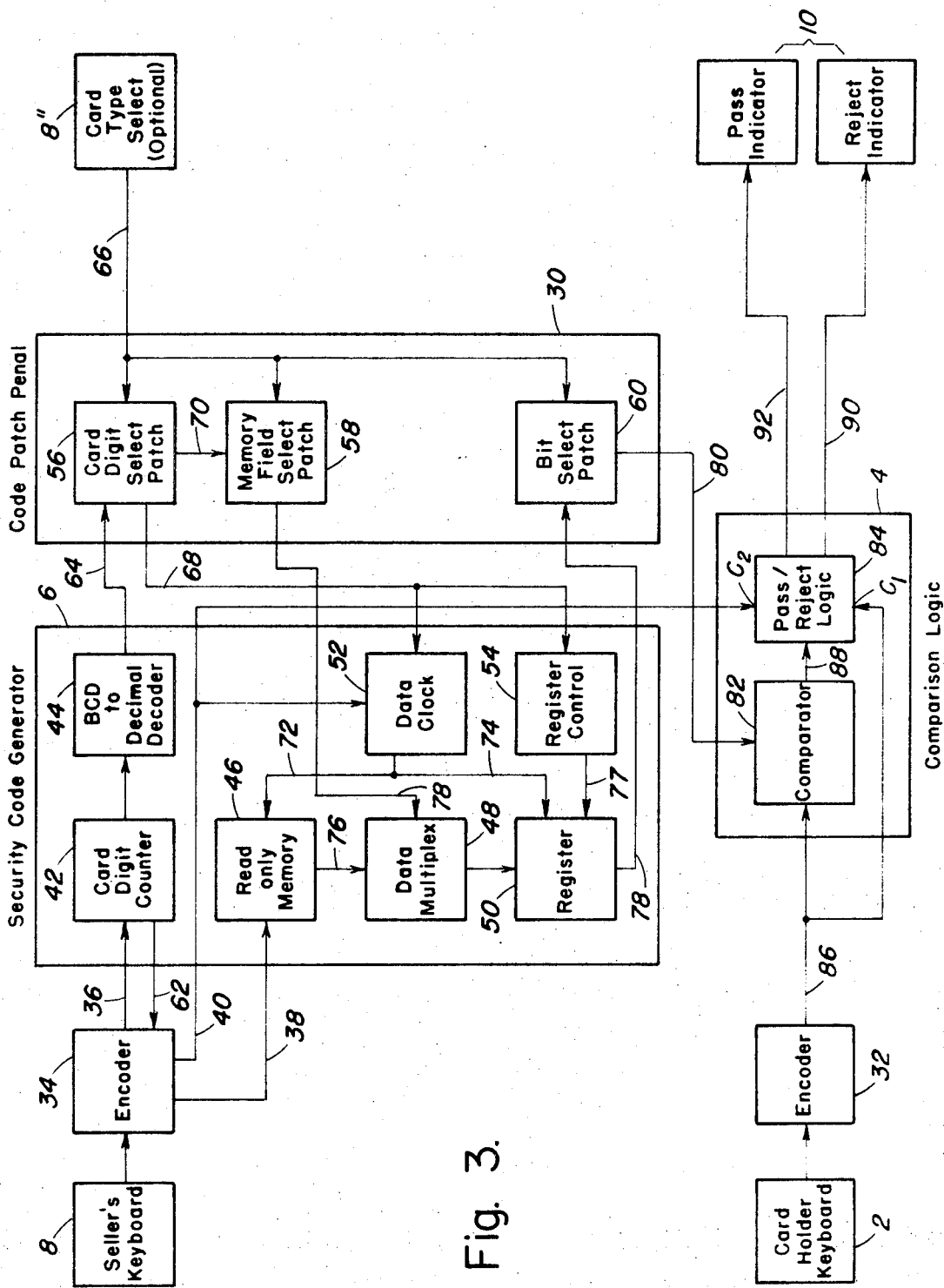
FIG. 3 is a detailed block diagram of the embodiment of this invention shown in FIG. 1.

As mentioned above, although the present invention is usable under any conditions wherein a credit card, identity card, access card or the like is presented and it is desirable to determine prior to the acceptance thereof whether or not the party presenting such card is an authorized user thereof, the instant embodiment of the invention will be disclosed in reference to conditions which would normally obtain upon the presentation of a credit card in payment for goods or services. It will be appreciated however, that the methods and apparatus disclosed herein will be fully applicable to situations where other types of cards or information bearing indicia are presented and that the only modifications of the invention required to be initiated by those of ordinary skill in the art will be those necessary to accommodate the conditions under which the information bearing card is presented.

The instant invention proceeds upon the concept that at the time of issuing an ordinary credit card or the like, a security code is also issued to the authorized party receiving such credit card. The security code is selectively associated with the account number on the credit card but is in no way indicated on the credit card in either a manner which renders it viewable or by specialized optical or magnetic markings from which such security code may be derived. Instead techniques are employed wherein the security code may be derived from selected ones of the digits in the account number by using a decoding technique which may vary for different credit card issuers and may be selectively changed at any time by any one or more of the credit card issuers subscribing to the instant invention so that the security code may be changed without changing individual account numbers or supplying new credit cards. The validating check performed by the instant invention acts to determine that the party presenting the credit card or the like is an authorized user thereof at least to the extent as to whether or not such party is in possession of the security code presently associated with the account number of the card presented. Furthermore, the techniques employed in the instant invention insure that the security code associated with the card presented is not violated since the security code is confidentially presented by the card holder as a direct input to the verifying apparatus and the security code derived by such verifying apparatus from the account number of the credit card presented is never directly read out.

Referring now to the drawings and more particularly to FIG. 1 thereof, there is shown a simplified general block diagram of an exemplary embodiment of verifying apparatus according to the present invention which serves to illustrate the major components relied upon therein. As is shown in FIG. 1, the depicted verifying apparatus comprises a card holder keyboard 2, comparison logic means 4, security code generator means 6, and a seller's keyboard 8. The card holder keyboard 2 takes the form of a keyboard having a plurality of depressible keys thereon and is adapted to accept a security code as furnished by the card holder. For the purposes of the instant disclosure, the security code which is issued to each card holder may be considered to consist of a two character alphanumeric code and accordingly, under these conditions, the card holder keyboard 2 would include a plurality of depressible keys having all or selected ones of the letters of the alphabet inscribed thereon as well as a plurality of depressible keys having selected numerals thereon. Although any type and number of characters may be selected for the security code, a multi-character alphanumeric code is here preferred due to the ease with which it can be committed to memory by the card holder. Additionally, for the purposes of instant disclosure the security code will be assumed to comprise a two character alphanumeric code, selected from 24 letters and eight numbers, it being noted that such code will yield 1,024 possible combinations for each card issuer and there is no restriction against different card holders having the same security code as it may be derived in a great number of ways. Thus, although any number of digits may be used, a two character alphanumeric code is here considered because it substantially simplifies the nature of the disclosure set forth below and in addition thereto will provide a sufficient number of available security codes for many purposes.

The card holder keyboard 2 may be entirely conventional in form and acts in the well-known manner to provide one of a plurality of parallel output signals for each of the keys on the card holder keyboard 2 which is depressed. In addition, as shall be seen below in connection with a discussion of FIG. 3, the card holder keyboard 2 also includes conventional encoding means which acts to apply a unique five bit binary code to each of the parallel signals applied thereto upon the depression of selected keys on said card holder keyboard 2. Therefore, upon the depression of two keys on said keyboard 2, two inputs will be provided in parallel to such encoding means and said encoding means will produce 10 bits in parallel at the output thereof representing the two letter alphanumeric code applied to the card holder keyboard 2 by the party presenting the credit card or the like. The 10 bits thus produced at the output of the card holder keyboard 2, are applied in parallel to the input of the comparison logic means 4 which is described below. It should be understood that the security code applied to the card holder keyboard 2 by a party presenting the card for validation and subsequent use should not readily be viewable to either a casual observer or a clerk to whom such credit card is presented. Therefore, the keys present on said card holder keyboard 2 should have a physical orientation calculated to render such keys readily viewable only to a party positioned directly in front of the housing therefor and such housing should be configurated and equipt with shielding means so that such keys are obscured from the view of a casual observer and/or a clerk to whom such credit card may be presented.

The seller's keyboard 8, includes an array of at least 10 depressible keys, slide switches or the like representing the decimal digits 0–9 and optionally may include means for selecting the type of card presented. The purpose of the array of at least 10 depressible keys, slide switches or the like is so that the account number inscribed on the face of the credit card may be applied as input information to the verifying apparatus depicted in FIG. 1 by the clerk to whom it is presented while the optional means for selecting the type of card presented is for applying information identifying the credit card issuer of the card presented to the depicted verifying apparatus and hence for enabling the appropriate security code generating routine for that credit card issuer. The seller's keyboard 8 may thus take the form of a first array of 10 depressible keys providing a parallel output indicative of the digit key depressed and a second row or column of depressible keys or their equivalents providing individual outputs indicative of the type of credit card presented. Thus, if it is assumed that a credit card which is presented has an account number including 10 significant digits, the clerk to whom such credit card is presented, would punch in such 10 significant digits in the order in which they appear and additionally would depress the key associated with the issuer of the credit card presented. Accordingly, it will be seen that the seller's keyboard 8 will produce one of 10 possible parallel outputs for each digit position of an account number on the credit card with a 10 output signal sequence representing the account number on the credit card presented. Additionally, the seller's keyboard 8 will provide a further signal representative of the issuer of the credit card presented. The outputs thus produced at the seller's keyboard 8 are applied as inputs to the security code generator means 6 as parallel inputs thereto. Although the seller's keyboard 8 has been described as including an independent array of depressible keys or the like for the input of account number information, it will be apparent to those of ordinary skill in the art that verifying apparatus of the type illustrated may be incorporated into an integrated credit checking, crediting, billing and processing system using on-line data processing techniques. Under these circumstances, touch tone or conventional dial telephone equipment would ordinarily serve as the link for widely separated input and output devices to a centralized data processing center. Thus, when these conditions obtain, the touch tone button array or the rotary dial may additionally be utilized as an input for credit card account number information.

As the instant disclosure proceeds upon the assumption that a credit card is presented, the seller's keyboard 8 has been disclosed as a manually actuated input means; however, as will be apparent to those of ordinary skill in the art, when the card presented is for access, security or other purposes; or when for some other reason a manually actuated input or the presence of a clerk is not desirable, a credit card reader could be substituted for the seller's keyboard 8. Therefore, in FIG. 1, a credit card reader 8' has been indicated by the dashed block connected in parallel with the seller's keyboard 8 and it will be appreciated that such credit card reader 8' may take the form of a conventional optical or magnetic reading device which provides the same information to the security code generator means 6 as the seller's keyboard 8.

The security code generator means 6 is described in detail both in regard to the functions thereof and appropriate structure therefor below in conjunction with FIGS. 2 and 3. At this juncture, however, it is sufficient to appreciate that the security code generator means acts upon a plurality of selected digits in the account number of the credit card presented, as applied thereto by the seller's keyboard 8 or the credit card reader 8', to generate a 10 bit binary code representative of the security code associated therewith. However, as will be seen below in conjunction with the description of FIG. 3, the digit positions in the account number used in such generation of a security code as well as the selected ones of a virtual multitude of ways in which the security code is generated is determined by schemes selected by the credit card issuer and independently variable in at least four distinct areas by such credit card issuer without any change in the nature of the account numbers of the credit cards issued. The output of the security code generator means 6, as further described below, comprises a 10 bit code which is applied in parallel to the input of the comparison logic means 4 and is representative of the security code associated with the account number of the credit card presented to a clerk. Accordingly, it will be seen that the security code generator means 6, accepts account number information and issuer information from any of a plurality of different types of credit cards and acts upon such information to generate a predetermined security code therefrom. Therefore, this function of the security code generator means 6 enables the verification apparatus depicted in FIG. 1 to assume a universal posture in that it may accept any and all of a large number of varying types of credit cards without a requirement that such credit cards exhibit specialized and uniform characteristics.

The comparison logic means 6 may comprise any conventional form of comparator device which acts in the well-known manner to compare two binary input signals applied thereto and produce an output signal representative of the results of such comparison. In the instant case, the comparison logic means 4, as aforesaid, receives a first 10 bit binary signal applied in parallel from the card holder keyboard 2 and representative of the two letter alphanumeric security code presented by the credit card holder and a second 10 bit binary signal applied in parallel from the security code generator 6 and representing the security code associated with the account number of the particular type of credit card presented to the clerk operating the seller's keyboard 8 or inserted in the credit card reader 8'. The comparison logic means 4 then acts on such first and second 10 bit binary signals applied in parallel thereto to produce an output signal representing the result of such comparison. In the verifying apparatus depicted in FIG. 1, the output signal produced by the comparison logic means 4 is applied to the accept or reject indicia means 10 which in the simplest case may take the form of two selectively energizable display means, such as incandescent or neon bulbs, wherein one of such display means indicates that the credit card presented should be accepted while the other such display means indicates that the credit card presented should be rejected and a transaction on credit terms be avoided. Thus, although the illustrated verifying apparatus acts to electronically derive the security code associated with the account number of a credit card presented and compare such security code with that presented by the credit card holder, the integrity of the security system disclosed herein is maintained because only an indication of whether or not the card should be accepted is provided. Although, in FIG. 1, the accept or reject indicia means 10 has been disclosed as connected to the output of the comparison logic means 4, it will be appreciated by those of ordinary skill in the art, that in access situations lock or gate means could be selectively energized by the output of said comparison logic means 4 and similar variations would be adopted under conditions wherein the verifying apparatus disclosed and card presented are relied upon for other varied functions.

Thus it will be seen that the verifying apparatus depicted generally in FIG. 1 may act upon any of several different types of credit cards and provide a threshold indication as to whether or not a party presenting a credit card is an authorized user thereof, at least to the degree of providing an indication of whether such party is in possession of the security code associated with such card. The operation of the generalized embodiment of this invention as illustrated in FIG. 1, will be described below in conjunction with FIG. 2.

FIG. 2 is a flow diagram illustrating the logical operation of the embodiment of the verification apparatus depicted in FIG. 1. In the operation of the generalized embodiment of the verification apparatus illustrated in FIG. 1, as indicated in the flow diagram of FIG. 2, the party presenting a credit card in payment for services or goods, or another type of card in an identity, access or similar situation will apply his security code information to the illustrated verification apparatus by depressing in the proper sequence an appropriate two of the depressible keys 12 which are present on the card holder keyboard 2. The information represented by the depression of two of the depressible keys 12 will be encoded, as aforesaid, and applied as a binary code in the form of 10 parallel bits to a first input of the comparison logic means 4. Similarly, the clerk to whom the credit card is presented will apply account number information to the illustrated verification apparatus by depressing, in the appropriate order, the depressible keys of the numerical array 14 present at the seller's keyboard 8. In addition, the clerk will also depress an appropriate one of the depressible keys present in a column of keys 16 on the seller's keyboard 8 to indicate the identity of the issuer of the credit card presented. Alternatively, as indicated in FIG. 2, if a credit card reader 8' is utilized, the same information inputs are optically or magnetically derived and applied to the illustrated verification apparatus. In FIG. 2, the security code generator 6 has been simply illustrated as comprising an encoder means 18, a plurality of program cards 20–24 and a logic block 26 so that the principles employed in the practice of the instant invention may be simply and easily conveyed to the reader at this point in the description of the instant invention. However, as shall become apparent to the reader during a consideration of FIG. 3, the encoder means 18 will hereinafter be considered to form a portion of the seller's keyboard and the preferred form of the apparatus relied upon in the security code generator means 6 is somewhat more complex than that indicated in FIG. 2 although a readily changeable program card in the form of selected data paths is associated with each credit card issuer input and may be readily and independently changed at the option of each subscribing credit card issuer.

As indicated in FIG. 2, the account number information signals supplied by the depressible key array 14 are applied to encoder means 18 whereat each digit value is encoded according to a prescribed format and applied as an input to the logic block 26. In addition, as is also indicated in FIG. 2, upon the depression of one of the keys in the column 16, the program card 20–24 associated therewith will be energized and may be here assumed to provide a control input signal to the logic block 26 indicative of the logic operations to be performed upon the encoded account number information signals applied thereto. In actuality, as will be rendered apparent below in conjunction with FIG. 3, each of the program cards 20–24 illustrated in FIG. 2 need only comprise a plurality of hard wired conductive paths which effectively control the manner in which encoded data is logically altered and manipulated in the logic block 26. Thus, as will be further appreciated below, each of the program cards 20–24 may be independently and periodically changed at the option of each credit card issuer to periodically change the security code associated with a given account number as well as the manner in which it is derived. Accordingly, as indicated in FIG. 2, the logic block 26 is in receipt of encoded data representing the account number present on the credit card presented and control information representative of the issuer of the credit card and hence the manner in which such encoded data is to be logically manipulated and altered.

The logic block 26 may here be considered to logically alter the data applied thereto, in accordance with the control information applied thereto by the program cards 20–24, in at least four independent aspects so that a 10 bit binary code representing the security code associated with the account number on that card is developed and subsequently applied to the second input of the comparison logic means 4. The various ways in which data applied to the logic block 26 is logically manipulated and altered so that the security code is derived therefrom will be discussed in detail below in conjunction with FIG. 3. Here, however, it is sufficient to appreciate that the 10 bit binary code representing the security code associated with the account number in the credit card presented is applied in parallel to the second input of the comparison logic means 4. The comparison logic means 4 acts in the well-known manner to compare the input signals applied to the first and second inputs thereof and produce an output signal representative of the result of such comparison. The output signal produced by the comparison logic means 4 is applied to the accept or reject indicia means 10 to thereby energize the appropriate indicator and thus provide a threshold indication as to whether or not the credit card presented should be accepted. Thus, it will be seen that the instant invention acts to provide a threshold decision as to whether or not the presentor of a credit card is an authorized user thereof, while accommodating a large number of differing credit cards which are not required to exhibit specialized characteristics. Furthermore, this invention allows any issuer of credit cards to independently change the program cards 20–24 and hence change the security codes associated with the account numbers on his cards without either changing the card or interfering with other users thereof.

Referring now to FIG. 3, there is illustrated a detailed block diagram of the generalized embodiment of this invention shown in FIG. 1. The form of the schematic block diagram illustrated in FIG. 3 has been modified slightly over that shown in FIG. 1 so that circuitry which is specially designed for periodic and/or independent variation at the option of the credit card issuers has been separately grouped and it will also be appreciated that previously utilized reference numerals have been relied upon to identify structure previously defined above so that the continuity of this specification is maintained. The embodiment of the verifying apparatus depicted in FIG. 3 comprises a card holder keyboard 2, a seller's keyboard 8, security code generator means 6, code patch panel means 30 and comparison logic means 4. The card holder keyboard 2 may take the same form described above anent FIG. 1 and it is again assumed for the purposes of this disclosure that the security code assigned to each authorized card holder by a credit card issuer takes the preferred form of a two character alphanumeric code which yields 1,024 discrete input combinations. Thus, the card holder keyboard 2 shown in FIG. 3 may be considered to take the form of an alphanumeric array which provides a discrete parallel output as aforesaid for each depressible key therein. Additionally, in FIG. 3, the encoder means associated with the card holder keyboard 2 has been separately illustrated as encoder means 32. The encoder means 32 may take the form of a conventional binary encoder and storage register which acts in the well-known manner to accept each alphanumeric input applied thereto in parallel and to encode each discrete input according to a predetermined binary sequence and thereafter store the same as a plurality of binary levels. Thus, assuming that the security code comprises a two character alphanumeric code, the encoder may take the form of an MSI chip or any other means well known to those of ordinary skill in the art which acts to encode each alphanumeric input applied thereto into a five bit binary code and produce a resultant output from a two character alphanumeric code input in the form of a 10 bit binary sequence formed by appending the code produced by the second input to that produced by the first input. The output of the encoder means 32 will thus comprise a 10 bit binary sequence which is produced in parallel wherein the first five bits of such sequence represents the first alphanumeric input applied to the encoder means 32 while the second five bits of such sequence represents the second alphanumeric input applied to the encoder means 32. However, as will be appreciated by those of ordinary skill in the art, the coding techniques relied upon in the encoder means 32 may be reversed for coding purposes such that the second alphanumeric input applied thereto is represented by the first five positions of the output while the converse relationship obtains for the first alphanumeric input. Furthermore, other techniques for forming the two five bit codes into a single 10 bit sequence are available and of course, any technique for assigning a five bit binary code to a given alphanumeric input may be employed. The output of the encoder means 32 is applied in the form of 10 parallel bits to the comparison logic means 4 in the manner indicated in FIG. 3 which is explained in detail below. At this portion of the specification it is sufficient to appreciate that one input to the comparison logic means 4 is relied upon for comparison purposes with a 10 bit signal produced by the code patch panel 30 while the second input thereto is utilized as a gating signal.

The seller's keyboard 8 illustrated in FIG. 3, may take the same form described above in conjunction with FIG. 1 and it will be appreciated that credit card reader means 8' can be substituted therefor as aforesaid. However, for the purposes of simplifying the representation in FIG. 3, it should be appreciated that information representing credit card account number information, i.e., information produced by the selective depression of the keys in the numerical array, is produced at the block 8 which is annotated seller's keyboard while credit card issuer information, which is optional and is produced by the depression of the keys in column 16 of FIG. 2, is accomplished at the block 8" annotated card type select. The output of the seller's keyboard 8, which takes the form of a plurality of parallel conductors representing the numerical digits 0–9, respectively, is applied to the encoder means 34. The encoder means 34 may be conventional and acts in the well-known manner to encode each digit input signal applied thereto by the seller's keyboard 8 into a four bit binary code representative of such digit input. Thus, as each digit of the account number on the credit card is read into the illustrated verifying apparatus, the encoder means 34 will produce a four bit binary signal representing the value of such digit. In addition to its encoding function, the encoder 34 also performs a rollover function for the seller's keyboard 8 in the manner well known to those of ordinary skill in the art, in that it prevents the insertion of data by the simultaneous depression of two or more keys on the seller's keyboard 8. Therefore, if it is again assumed that the account number of the credit card under consideration includes 10 usable digits, the encoder means 34 will receive 10 discrete inputs wherein the digit value of each input is represented by the conductor upon which it is applied and the digit position of such input within the account number sequence is indicated by the order in which it is applied. In a corresponding manner, as each input is received, the encoder means 34 will produce a four bit output signal whose value represents the value of the input signal encoded and the order in which the encoder means 34 produces such output signals will be indicative of the position in the credit card account number of the input signal from which such output signal is derived. The output signals produced by the encoder means 34 are connected to the security code generator means 6 via conductors 36 and 38. An additional output is also provided from the encoder means 34 to the security code generator means 6 through the conductor 40; however, the nature of this output is explained below as it originates in the security code generator means 6.

The security code generator means 6 and the code patch panel means 30 shall be considered together since in actuality they both form an integral portion of the apparatus relied upon in the generation of the security code. It should be noted, however, that each component present within the code patch panel means 30 is a component having a plurality of selectable modes of operation which may be independently varied at the option of credit card issuers adopting the instant invention. As indicated in FIG. 3, the security code generator means 6 comprises card digit counter means 42, binary to decimal decoder means 44, a read only memory 46, data multiplex means 48, register means 50, data clock means 52 and register control means 54. Additionally, the code patch panel means 30 comprises a card digit select patch means 56, a memory field select patch means 58 and a bit select patch means 60. The card digit counter means 42 may take the form of a conventional magnetic, flip-flop or MSI four bit binary counter means which acts in the well known manner to count each group of four input pulses applied thereto by the encoder means 34 and produce an output signal indicative of the receipt of each group of four pulses. The output signals produced by the card digit counter means 42 thereby represents the sequence position of each of the four bit binary signals produced by the encoder means 34 and hence the digit position in the account number of the credit card that each of such four bit binary signals represents. The output of the card digit counter means 42 is connected to the input of the binary to decimal decoder means 44. Additionally, the card digit counter means 42 is adapted to produce in the conventional manner an independent output on conductor 62 whenever the state of the count in the card digit counter means 42 is such that ten digit positions have been counted which here indicates that the credit card account number information has been fully loaded.

The binary to decimal decoder means 44 may take any conventional form of circuit means which is responsive to each digit position output signal produced by the card digit counter means 42 to enable a distinct output line associated with the digit position then being indicated. For example, the binary to decimal decoder means 44 may take the form of a magnetic, flip-flop or MSI shift register or counter configuration adapted to receive a serial input and produce a parallel output. In the instant case, the binary to decimal decoder means 44, would include 10 distinct output lines wherein an ordered one of such 10 distinct output lines would be enabled upon the receipt of each digit position indicating signal produced by the card digit counter means 42. The ten discrete output conductors associated with the output of the binary to decimal decoder means 44 are connected in parallel to the inputs of the card digit select patch means 56 present in the code patch panel means 30. Thus, as will be apparent to those of ordinary skill in the art, the card digit counter means 42 and the binary to decimal decoder means 44 act in combination to indicate the digit position of each of the four bit binary code signals produced by the encoder means 34 because as each decimal digit is applied to the encoder means 34 in the sequence in which it appears in the account number of the credit card, the encoder means 34 will produce a four bit binary code representing the value thereof. The card digit counter means 42 then counts each four bit signal produced by the encoder means 34 and produces an output signal representing each of the four bit groups. The output signals produced by the card digit counter means 42 are applied in series to the binary to decimal decoder means 44 which acts to enable an appropriate digit position indicating output for each signal thus received and thereby provides a discrete output for each digit position associated with the input signal derived from the account number. For instance, if the first digit applied to the encoder is a decimal 9, the encoder means 34 will produce an appropriate four bit code therefor. This four bit code is counted at the card digit counter means 42 and an output signal representative of the first four bits is applied to the binary to decimal decoder means 44. In response to this first four bit indicating signal, the binary to decimal decoder means 44 will act to energize the first digit position output conductor thereof. This process is continued until each of the ten output conductors associated with the binary to decimal decoder means 44 is enabled so that, as will be apparent, the state of each of such output conductors at any instant of time will be indicative of the digit position being read in. Thus, the binary to decimal decoder means 44 acts to selectively enable each of the 10 outputs thereof in accordance with the digit position of the account number of the credit card for which the encoder means 34 is providing a binary signal. The outputs of the binary to decimal decoder means 44 are connected through cable 64 to the input of the card digit select patch means 56 as present in the code patch panel means 30.

The card digit select patch means 56 takes the form of a multi-module gating network which performs at least two discrete logic functions within the depicted validating apparatus and the manner in which each of such functions is performed is variable in response to control signals applied thereto. The first function of the card digit select patch means 56 is to select the digit positions in the account number of the credit card which are to be inspected by providing an output signal which is appropriately timed to coincide with the output of the binary coded signals representative thereof on conductor 38. The second function of the card digit select patch means 56 is to provide an output signal whose waveform is appropriate to energize the data clock means 52 in a manner such that one of two types of clocking signals is produced in a manner which is discussed hereinafter. The card digit select patch means 56 may be considered to take the form of a multi-module gating configuration wherein each module is associated with a particular gating arrangement. Each module, in turn, is associated with a particular credit card issuer and a particular module is selectively enabled while the remaining modules are disabled by an input control signal representing a given credit card issuer supplied on conductor 66 from the card type select block 8" which represents, as aforesaid, the portions of the seller's keyboard containing the column 16 of depressible keys shown in FIG. 2. The provision of the instant invention with the capability of operating upon credit cards from several issuers is optional and it will be appreciated that if only a single issuer's cards are to be accepted only a single module within the card digit select patch means 56 will be required. For ease of explanation, each of the modules present within the card digit select patch means 56 may be considered to take the form of individual gating arrangements which act in the conventional manner upon the receipt of a predetermined number of inputs to provide an output signal having a predetermined polarity. For instance, if for a given credit card issuer, the second, fourth, sixth and ninth digit positions of the account number are to be utilized to derive the security code, the gating arrangement of the module associated therewith would produce a pulse of one of two possible polarities when an input from conductor 66 specifying that module was received and the first and second outputs in cable 64 were enabled. A second pulse of one of two possible polarities would also be produced with the enabling of the first through fourth outputs in cable 64 while additional pulses would be produced with the enabling of the first through sixth and the first through ninth outputs in cable 64. The polarity of output pulses produced by each module will vary in a manner such that if it is assumed that four digit positions of the account number are to be inspected, two of such pulses may be of one polarity while the remaining two pulses may be of opposite polarity, however, as will be seen below, this relates to the manner in which data is addressed to the read only memory means 46 and hence, as will be appreciated below, if another memory configuration were utilized a single polarity output could be relied upon or various other polarity output combinations could be selected.

The structure of the card digit select patch means 56 is such that individual credit card issuers employing the present invention may periodically and independently of other users thereof change the digit positions of their credit cards which are inspected for security code information by changing the module and hence the gating arrangement associated with their credit card. To facilitate such change each of the modules present in the card digit select patch means 56 is configurated in plug-in form so that the periodic change of such modules may be quickly and easily carried out. Furthermore, although for the purposes of this description each of the modules present in the digit select patch means 56 was considered to comprise a conventional gating arrangement per se, it will be appreciated by those of ordinary skill in the art that substantial cost reductions associated with such periodic changes may be effected by hard wiring the logic elements associated with the gating arrangement into the card digit select patch means 56 and providing the plug-in modules in the form of printed circuit configurations for such logic elements. The output of the card digit select patch means 56 is applied through the conductor 68 to the input of the data clock means 52 and the register control means 54 and through the conductor 70 to the input of the memory field select patch means 58. Accordingly, it will be appreciated that the card digit select patch means 56 enables the instant invention to inspect predetermined digit positions of the account numbers present on a plurality of credit cards while allowing the credit card issuer to select which digit positions of his cards are examined and to periodically change the digit positions selected. Furthermore, as shall be seen below, the card digit select patch 56 also allows the credit card issuers to control the initial manner in which the security code is derived independently of the manner in which such initial derivation is accomplished for other credit card issuers.

The read only memory means 46 as present within the security code generator means 6 may take the form of any conventional permanent or semi-permanent memory which may be selectively and nondestructively read out. Thus, the read only memory means 46 may comprise any magnetic, flip-flop or MSI array which has information permanently or semi-permanently stored therein and may be selectively addressed so that a word in the column or alternatively the row direction may be selectively read. In a preferred embodiment of the instant invention, the read only memory 46 takes the form of a two-dimensional 64×8 array on an MSI chip. However, as shall be seen below, since only forty, four bit storage locations are required for the conditions imposed for the purposes of the instant disclosure, only a 20×8 bit portion of such an array will be considered although a 40×4 portion thereof could alternatively be used. As discussed above, the security code information contained in an account number of a given credit card will be associated with four digit positions of the account number and the numerical value of the digit present in each digit position may vary from zero to nine (0–9). Furthermore, as each digit value is encoded by the encoder means 34 into a four bit binary code and it is desirable to operate on this basis in the derivation of the security code; each digit position of the account number associated with security code information will require ten, four bit addressable storage locations associated therewith in the read only memory means 46 and hence 40, four bit locations in the read only memory means 46 will be required under the conditions here specified.

If it is assumed that a 64×8 MSI array is here relied upon for the read only memory means 46, only the first 20 eight bit columns will be considered as utilized and such 20, eight bit columns are divided into four fields wherein each field is associated with one of the four digit positions of the credit card account number containing security code information. Each of the four fields thus present in the read only memory means 46 will thereby contain 10 columns and each column will include four bit positions of a given field therein. Thus, considering such 20×8 portion of a 64×8 MSI array, columns 1–10 would define fields 1 and 3 and columns 11–20 would define fields 2 and 4 while rows 1–4 would define fields 1 and 2 and rows 5–8 would define fields 3 and 4 as indicated generally in Table A below which illustrates a simplified look up field arrangement usable in the read only memory means 46.

In the read only memory means 46, the addressible columns of each field have a four bit binary code permanently or semi-permanently stored therein in a manner such that binary values available from 10 of the 16 values present in a four bit binary code are stored therein; however, the assignment of such binary codes is completely arbitrary and varies from field to field. A typical binary code assignment which may be used in the instant invention is illustrated in Table A below; however, it will be realized that any mode of assignment may be selected and the same binary value may be used in more than one column position of a given field.

TABLE A

```
ROW              COLUMN ADDRESS
ADDRESS      Fields 1 & 3            Fields 2 & 4

1 2 3 4 5 6 7 8 9 10    11 12 13 14 15 16 17 18 19 20
         1   0 0 1 1 0 1 0 1 0 0      0  1  0  0  0  0  1  1
                                         1  1
Fields   2   0 0 1 0 0 1 0 1 0 1      1  1  0  1  0  1  0  0
                                         1  1
         3   1 0 1 0 0 0 1 1 0 0      0  0  1  0  0  1  0  1
                                         0  1
A 1 & 2  4   0 0 1 0 1 0 1 0 1 1      1  1  0  0  1  0  0  0
                                         0  1
         5   0 0 1 1 0 0 1 1 0 1      1  0  1  1  1  0  0  0
                                         0  0
Fields   6   1 0 1 1 0 0 0 1 0 1      1  0  1  0  0  1  1  1
                                         0  0
         7   0 0 1 0 1 0 0 1 0 0      1  0  0  1  0  1  0  0
                                         0  1
3 & 4    8   1 1 0 0 1 1 0 1 0 0      1  0  0  0  0  0  0  1
                                         1  0
             0 1 2 3 4 5 6 7 8 9      0  1  2  3  4  5  6  7
                                         8  9
```

DIGIT VALUE ASSIGNMENT

The read only memory means 46, under the conditions specified above, receives a first input signal in the form of four bits in parallel from the encoder means 34 through the conductor 38. As will be recalled, the signal on conductor 38 is the binary coded value of the digit in the digit position presently being applied to the encoder means 34 from the seller's keyboard 8. This first input to the read only memory means 46 is an address input which is applied in the conventional manner so that a column in each of fields 1–4 is addressed in accordance with the digit value of the digit positions of the account number of the credit card. The assignment of the column addresses may, for simplicity, be considered to be carried out in a manner such that the digit value corresponds to the column number; however, it will be appreciated that the address assignment may be arbitrarily selected and arranged to add further security to the manner in which the security code is derived. As an example of the above simplified address assignment, if the first and second digit positions of the credit card account number as applied to the encoder means 34 are assumed to have digit values of a zero followed by a 9, column 1 of fields 1 and 3 and column 11 of fields 2 and 4 and hence columns corresponding to 1 and 11 in the above table will be initially addressed, followed by the addressing of columns 10 and 20. Similarly, if the third and fourth digit positions of the credit card account number contain digits whose values are 1 and 8, respectively, columns 2 and 12 and thereafter 9 and 19 in the table above, corresponding to the selected twenty column portion of the array, will be addressed. Thus, it will be seen that as each digit of the credit card account number is applied to the encoder means 34, a four bit binary signal representing the value thereof will be applied through conductor 38 as an address input to the read only memory means 46. This address input will selectively address the column in each of the four fields assigned the value of that digit. Under the conditions here specified, wherein a 20×8 portion of the array is relied upon and the fields are stacked in the manner indicated in Table A and have commonly positioned address assignments, and each address input on conductor 38 will cause only two columns, i.e., one of columns 1–10 and one of columns 11–20, to be addressed because each column is common to two fields; however, it will be appreciated that should a 40×4 array be relied upon or should a different address assignment sequence be utilized for each field, four discrete columns would be addressed. In any case, it will be seen that each application of an address input on conductor 38 results in the addressing of one column in each field. Alternatively, however, as will be readily understood by those of ordinary skill in the art, the address may be further defined by adding a bit thereto so that only one column in the entire array is selectively enabled.

A second input to the read only memory means 46 is applied from the data clock means 52 through conductor 72. This input, as shall be further appreciated below, is an enabling input and serves two distinct functions. The first function of the input applied to the read only memory means 46 through conductor 72 is to enable the readout of only one of the two columns which are addressed under conditions specified above each time an address input is applied to the read only memory means 46 on conductor 38. The second function of the input applied on conductor 72, is to read out the selected one of the addressed columns in the read only memory means 46 when the columns addressed by the input applied on conductor 38 are those associated with the digit positions of the credit card account number containing security code information. Thus, although the address inputs applied on conductor 38 under the conditions specified above will cause two columns in the read only memory means 46 to be addressed for each of the ten usable digits of the credit card account number, the enabling input applied on conductor 72 from the data clock means will cause the readout of only one column which is addressed for a given digit of the account number and such readout is timed to occur only when the digit positions of the account number containing security code information have caused the addressing of the read only memory means 46. The first function of the input applied to the read only memory means 46 is accomplished, as shall be seen below, by the waveform associated with such input, while the second function is accomplished by the timing associated with the application of such input.

The data clock means 52 may be considered to take the form of flip-flop means or any other type of conventional clock generator means which acts in the well known manner to produce or more pulses of appropriate amplitude and duration upon the application of an input signal thereto. The input to the data clock means 52 is applied thereto through conductor 68 from the card digit select patch means 56. Thus, the input to the data clock me 52, means will be recalled, takes the form of a positive or negative pulse which is applied at the same time that digit information from one of the four digits of the credit card account number which is associated with security code information is applied to the encoder means 34. The data clock means 52 acts in response to each input pulse applied thereto on conductor 68 to produce an appropriately timed output pulse which takes one distinct waveform for a positive input pulse and another distinct waveform for a negative input pulse. In this regard, the data clock means 52 may, for simplicity, be assumed to take the form of two complementary flip-flops whose inputs are commonly connected to the input conductor 68 and are thus individually responsive to either positive or negative input pulses to produce either a positive or negative output pulse on conductor 72. A second output of the data clock means 52 is connected through conductor 74 to the register means 50, while an inhibit input is applied thereto from the encoder means 34 through conductor 40. The inhibit input is produced by the encoder means 34 in response to a pulse received on conductor 62 from the card digit counter means 42 to indicate that 10 usable digit positions of the credit card account number have been received and thus, the input sequence is complete. The inhibit input applied to the data clock means 52 on conductor 40, acts to enable conventional gating circuitry therein to inhibit the further application of output pulses on conductors 72 and 74 until a new sequence representing the application of another account number to the illustrated apparatus is begun. Thus, it will be seen that the data clock means 52 acts in response to input signals applied thereto from the card digit select patch means 56 to produce an enabling signal having one of two discrete waveforms at intervals appropriately timed to correspond to the input of address information on conductor 38 which represents digit positions of the account number of the credit card containing security code information. Although the data clock means 52 and the enabling input applied to the read only memory means 46 through conductor 72 have been described as if single, properly directed pulses are applied in a relationship calculated to correspond to the application of address signals representing the digit value for digit positions in an account number which contain security code information, various alternatives to this arrangement will be obvious to those of ordinary skill in the art. For instance, the two functions of the enabling pulses applied to conductor 72 could be separated and two inputs therefor could be applied to the read only memory means 46 wherein one such input enables a select one of the addressed columns and the other input achieves a properly timed readout thereof. Additionally, in embodiments of the invention wherein the address is further defined so that only a single column is addressed, the data clock means 52 need only accomplish an appropriate timing function so that digit positions associated with security code information are read out.

Upon the time coincidence of an address input for a given two columns of the 20×8 array portion of the read only memory means 46 described above and a timed enabling input defining one of such two columns, the bit positions of each of the eight rows included in the column thereby designated are read out in parallel and applied through conductor 76 to the data multiplex means 48. However, as indicated in the table above, due to the stacked nature of the 20×8 array, the first four bits thus read in parallel will be associated with either field 1 or 2 depending upon whether a column in columns 1–10 or 11–20, respectively, is read while the second four bits read in parallel will be associated either with field 3 or 4 depending upon which column is read. Thus, referring again to Table A, if column 5 is read out the bits 0001 will be from field 1 and bits 0011 will be from field 3 while if column 15 is read out bits 0001 will be from field 2 and bits 1000 will be from field 4. Accordingly, one column in the read only memory means 46 is thus read out for each of the four digit positions of the credit card account number associated with security code information and upon the reading of each such column the eight bits contained therein will be applied in parallel to the data multiplex means 48 through conductor 76.

The data multiplex means 48 may take any of the well known forms of logic apparatus of this nature which acts in the conventional manner to order and select individual ones of the inputs applied thereto in accordance with control information and apply selected ones of such inputs to the outputs thereof. In the instant case, the data multiplex means 48 functions only to apply either the first four of the eight bits applied in parallel thereto to the output thereof or alternatively to apply the last four bits of the eight bit input received thereby from the read only memory means 46 to the outputs thereof. Therefore, the data multiplex means 48 may take the form of logic register means wherein each of the eight inputs applied thereto is selectively gated in accordance with control information so that either inputs 1–4 or inputs 5–8 are applied to the outputs thereof. Alternatively, the function of the data multiplex means 48 may be accomplished by placing an And gate in each input line and gating the control inputs of the first four of such And gates to one control connection while the control inputs of the second four And gates would be commonly connected to a second control source. If this arrangement were utilized the outputs of the first and fifth, second and sixth, third and seventh and fourth and eighth And gates, respectively, would be commonly connected to assure an output of four bits in parallel wherein such bits represent either the first four bits of the output of the read only memory means 46 or the last four bits thereof. Thus, the data multiplex means 48 functions to separate the eight bits applied in parallel to the inputs thereof into either four bits derived from the top four rows of the column in the read only memory means 46 which was read or the bottom four row positions thereof. Accordingly, it will be seen that the data multiplex means 48 separates the four bits associated with a desired field, in accordance with a control signal, from those row positions of the undesired field having the common column and applies such desired four bits in parallel to the output thereof. For instance, referring to Table A, if column 5 is again assumed to be read, of the eight bits applied in parallel to the input of the data multiplex means 48, either the bits present in field 1, i.e., 0001, or the bits present in field 3, i.e., 0011, will be present at the output of the data multiplex means 48.

The control input to the data multiplex means 48 is connected through conductor 78 to the memory field select patch means 58. The memory field select patch means 58 takes the form of a plurality of printed circuits which are selectively connected to conventional pulse generator means. Each of the plurality of printed circuits is associated with a given credit card issuer and will be selectively connected to control the pulse generator means upon the receipt of an information signal on conductor 66 indicating that the type of credit card associated therewith is undergoing validation. The printed circuit means preferably takes the form of plug-in modules as was discussed in conjunction with the card digit select patch means 56 so that each individual credit card issuer may periodically and independently change his associated printed circuit and thereby change, as will be seen below, the second sequency in the derivation of the security code associated with the account numbers of his credit cards. The pulse generator means present in the memory field select patch 58 acts to generate a sequency of four pulses whose polarities are individually determined by printed circuit means selectively connected thereto and hence controlled by the printed circuit modules selected individually by the credit card issuers. Each pulse of the four pulse sequence produced by the pulse generator means present in the memory field select patch means 58 is timed to coincide with the readout of one column of the read only memory means 46 by the same timing information relied upon to enable the readout thereof. The timing input to the memory field select patch means 58 is applied from the card digit select patch means 56 through the conductor 70. Therefore, as this is essentially the same information relied upon to drive the data clock means 52, it will be appreciated that each control pulse produced by the memory field select patch means 58 will coincide in time with the reading out of selected columns of the read only memory means 46. Accordingly, it will be seen that the memory field select patch means 58 controls whether the top or bottom four bits of the eight bit column read out from the read only memory means 46 appear at the output of the data multiplex means 48. Therefore, while the card digit select patch means 56 allows each credit card issuer to independently select which digit positions of the account number of his credit card are inspected and further determine with the 20×8 array discussed whether columns common to the first and third or second and fourth fields are used in the initial step of the derivation of the security code; the memory field select patch means 58 additionally enables the credit card issuer to select which one of the two previously selected field locations is to be utilized in the derivation of security code information for a given digit position of the credit card account number. Thus, substantial independent control has been provided thus far for each credit card issuer adopting the instant invention.

The output of the data multiplex means 48 is applied to the register means 50 in the form of four bits in parallel for each column of the read only memory means 46 which is read out. Thus, under the conditions specified heretofore, the register means 50 receives four bits in parallel for each digit of the account number associated with security code information and hence the register means 50 receives four inputs of four bits in parallel for each credit card undergoing validation. The register means 50 may take the form of a conventional flip-flop, magnetic or MSI buffer means which under the conditions specified above may accommodate 16 bits of information applied in parallel thereto. For the purposes of this disclosure, the register means 50 may be considered to take the structural form of four, four bit registers having gated inputs although it will be readily appreciated that a single long register means may be used as well. Each of the four, four bit registers is adapted to receive and read out each bit of information in parallel and one bit position of each of the four individual registers in the register means 50 is connected to an associated one of the four outputs from the data multiplex means 48. Each of the four registers within the register means 50, is individually gated and thus each time that a column in the read only memory means 46 is read out, four bits in parallel will be applied to the gated inputs of each four registers present within register means 50. Gate enable pulses are applied to the register means 50 from the register control means 54. The register control means 54 may take the form of a four bit ring counter, a shift register or any other conventional means which responds to a predetermined number of timed input pulses applied thereto to produce an output pulse at a different output thereof for each one of such predetermined number of pulses. Input pulses are applied from the output of the card digit select patch means 56, through conductor 68, to the input of the register control means 54 and as these pulses are the same pulses as are applied to the data clock means 52, it will be appreciated that each of such pulses is timed to coincide with the addressing of the read only memory means 46 with digit values from digit positions containing security information and hence the application of enabling pulses thereto the thereby read out such addressed columns from the read only memory means 48 and the attendant application of four bits in parallel from the data multiplex means 48 to the register means 50. Each of the four outputs of the register control means 54 is applied through cable 77 to the gating input of the register means 50 in a manner such that each output of the register control means 54 is connected to the gating input of one of the four registers therein. Thus, although a multitude of ordering permutations and combinations are available to further increase the security which attaches to the techniques for security code generation here employed, if it is assumed that each bit output of the data multiplex means 48 is connected to corresponding gated inputs of each of the four registers present in the register means 50 and that the gating outputs produced by the register control means 54 are connected to the four registers in the register means 50 in a one, two, three, four sequency; it will be seen that when the first four data bits are applied in parallel from the data multiplex means 48 to the register means 50 they will be stored as four parallel bits in the first register due to the application of the first gating signal from the register control 54 thereto, the second four bits will be stored in parallel in the second register and this process will continue until 16 bits in four bit groups representing each of the four significant digit positions in the credit card account number have been loaded into the register means 50. Thus, when the register means 50 is fully loaded, which occurs at the completion of the reading in of the credit card account number at the seller's keyboard 8, keyboard register means 50 will contain 16 bits of information in parallel. As the register means 50 is a parallel input, parallel output device, as aforesaid, the output of the fully loaded register means 50 will take the form of sixteen bit levels in the form of binary 1's 0's. output of the register means 50 is applied in parallel through cable 78 to the bit select patch means 60.

The bit select patch means 60, takes the form of a plurality of selectable logical gating arrangements which each acts upon the receipt of 16 ordered inputs to pass only ten of such inputs in a selected order to the outputs thereof. Each of the selectable gating arrangements is associated with one of the credit card issuers subscribing to the invention and is selected by the application of an input on conductor 66 from the column of credit card issuer keys 16, shown in FIG. 2, as indicated by the card type select block 8″ in a manner similar to that used for the card digit select patch means 56 and the memory field select patch means 58. Each of the selectable gating arrangements will preferably be structured in the form of a plug-in module to facilitate periodic and independent substitution by each of the subscribing credit card issuers and although each selectable gating arrangement would comprise a conventional decoder tree, cost considerations again render it preferable that the logic elements be placed permanently within the bit select patch means 60 and that the plugin modules include only printed circuit connections therefor in the same manner discussed above in connection with the card digit select patch means 56 and the memory field select patch means 58. Under the conditions assumed present above, the bit select patch means 60 is in receipt of 16 binary input levels and will selectively pass to the ten outputs thereof, in accordance with the gating arrangement selected, 10 of such binary input levels in a selected order. The bit select patch means 60 thereby enables each subscribing credit card issuer to further control the manner in which the security codes associated with his credit cards are developed in at least two additional areas. The first such area is that the credit card issuer by designating a predetermined gating arrangement selects which ten positions of the sixteen input bit positions are to be utilized in the derivation of his security codes, while the second such area is that the credit card issuer also selects the order in which the selected bits appear in the output. For instance, a credit card issuer could select that the first 10 input bits applied to the bit select patch means 60 are to be used and applied to the ten outputs of the bit select patch means 60 in inverse order. Under these conditions if the sixteen bit input to the bit select patch means 60 is 1100101100011101, the last six bits, i.e., 011101, would be stripped and the first ten bits, i.e., 1100101100, would be reordered so as to appear as 0011010011 at the ten bit output of the bit select patch means 60. The ten bit output of the bit select patch means 60 is applied in parallel to the comparison logic means 4 through conductor 80. Thus, it will be appreciated that the code patch panel of the instant invention allows any credit card issuer subscribing thereto to select and independently vary: (1) the digit positions of the account number of his credit card which are used in the derivation of the security code; (2) the binary codes used in the derivation of the security code information from each digit position from one of four separate memory fields; (3) 10 of 16 resulting bits for use in the derivation of the security code; and (4) the order in which such 10 bits appear to thereby complete the derivation of the security code.

The comparison logic means 4 comprises a comparator means 82 and logic gating means 84. The comparator means 82 may take the form of a conventional comparison device which acts in the well-known manner to compare the corresponding bits of two binary input signals applied thereto and produce an output signal indicating the presence of an identity between such two binary input signals or the lack thereof. In the instant case the comparator means 82 will act to compare each bit of two ten bit binary inputs applied thereto and produce at the output thereof a binary one output if an identity therebetween is present while a binary zero output is produced when any bit of such two 10 bit binary inputs are not the same. A first 10 bit binary signal is applied in parallel from the encoder means 32 to one input of the comparator means 82 through the cable 86 while a second input is applied in parallel thereto from the bit select patch means 60 through the cable 80. As will be recalled from the preceding portions of this disclosure, the first input thus applied to the comparator means 82 represents the binary encoded two letter alphanumeric security code applied by the card holder at the card holder keyboard 2 while the second 10 bit binary input applied in parallel to the comparator means 82 from the bit select patch means 60 represents the security code associated with four digits in the designated digit positions of the credit card under consideration, as derived in the security generator means 6 in the manner preselected by the credit card issuer. The output of the comparator means 82 is connected to an input of the logic gating means 84 through conductor 88.

The logic gating means 84 is a conventional output gating device which, when enabled, is responsive to a binary input to produce an output on one of two conductors depending on the value of such binary input. In the instant case, when the logic gating means 84 is enabled a binary 1 applied to the input thereof on conductor 88 will cause an output to be produced by the logic gating means 84 on conductor 92 while if a binary zero is applied through conductor 88 an output will be produced on output conductor 90. The logic gating means 84 is enabled whenever both of the control inputs $C_1$ and $C_2$ have input signals applied thereto to thereby set gates associated therewith. The enabling signal applied to the control input $C_1$ is derived from the output of the encoder means 86 and hence this enabling signal is indicative that the entry of security code information at the card holder keyboard 2 has been completed. Similarly, the enabling signal applied to the control input $C_2$ of the logic gating means 84 is applied from the encoder means 34 through conductor 40. Thus, as the signal applied to the conductor 40 from the encoder means 34 derives, as described above, from the card digit counter means 42 and indicates the receipt of data from the 10 usable digit position in the credit card account number, the enabling signal applied to control input $C_2$ is indicative that the entry of account number information at the seller's keyboard 8 or, alternatively, the credit card reader 8' has been completed. Therefore, it will be appreciated that the logic gating means 84 will only be enabled when both the credit card holder and the clerk maintaining the seller's keyboard 8 have completed their respective functions of entering data. The outputs of the logic gating means 84 are connected through conductors 92 and 90 to the pass and reject, respectively, indicia means 10. The pass and reject indicia means 10 may take the same form described above in conjunction with FIG. 1 and it will be appreciated that when a signal is applied to conductor 92 indicating that a favorable comparison has been made, the pass indicia will be actuated while a signal applied to conductor 90, indicating an unfavorable comparison, will actuate the reject indicia.

For the purposes of explaining the operation of the embodiment of this invention depicted in FIG. 3, it will be assumed that a credit card issued by the American Express Company has been presented which has an account number of 040-437-877-0-100AX and has a security code of AE associated therewith. Furthermore, to facilitate the description of the operation of this invention which follows, all of the simplifying assumptions made above will be observed; however, it will be appreciated that in actual embodiments of this invention binary coding and addressing assignments would ordinarily not be arranged in sequences of a straight forward ascending order so that additional security for the code deriving techniques employed would be provided. Thus, in the operation of the embodiment of this invention shown in FIG. 3, upon presentation by a holder of the credit card mentioned above, the clerk would depress a start button to clear the apparatus and the appropriately numbered keys at the seller's keyboard so that the account number 040-437—0 was read in, it being noted that the digits 100AX are not here relevant and are discarded; and in addition thereto, the clerk would also depress the American Express key at the seller's keyboard which is indicated by block 8", annotated card type select. Similarly, the party presenting the credit card would depress the keys A and E on the card holder keyboard 2.

Upon the depression of the keys A and E in sequence on the card holder keyboard 2, an input signal corresponding to an A input will be applied to the encoder means 32 followed by an input signal corresponding to an E. The encoder means 32 will respond to each of these inputs to encode them into a five bit binary code associated therewith and to produce a 10 bit parallel output on cable 86 which is formed by appending the five bit code produced from the E input to that produced from the A input in the manner previously described above. Since the letters A and E represent the first and fifth letters of the alphabet and a straight forward ascending order encoding technique is here assumed for the purposes of simplifying this disclosure, the binary code assigned to an A input may be considered to be 00001 while the binary code assignment for an E input is 00101, it being noted that all other letter inputs would receive a binary code corresponding to the decimal position which that letter takes within the alphabet and numerical characters would receive the binary code assignments which remain. Thus, the encoder means 32 will respond to the card holder supplied security code A-E at the card holder keyboard 2 to produce the code sequence 0000100101 at the output thereof by appending the five bit binary code representing an E input to the five bit binary code representing an A input. Accordingly, the ten bit output code thereby produced by the encoder means 32 is applied in parallel to the cable 86 and hence the comparator means 82 has the code sequence 0000100101 applied in parallel to the first input thereof while the enable input $C_1$ of the logic gating means 84 also receives this input.

In a similar manner, upon the depression of the keys 040-437—0 in sequence at the seller's keyboard 8, the encoder means 34 will receive ten discrete inputs in sequence wherein the value of a digit represented by an input is indicated, as aforesaid, by the parallel conductor on which it is received and the digit position within the credit card number is indicated by the order of the input within the sequence received. As each input is received by the encoder means 34 the input is encoded into a four bit binary code in the conventional manner and for the purposes of simplification, it may be assumed that a straight forward digit value to corresponding binary code value encoding technique is utilized although it will be appreciated that a permuted coding scheme would lend more security to the instant invention and hence may be employed in practical embodiments of this invention. Thus, as the first digit of the sample account number is a decimal 0, the encoder means 34 would respond in the conventional manner to the first input received thereby to produce the four bit binary code 0000 at the outputs thereof connected to conductors 36 and 38. Similarly, the encoder means 34 would respond to the subsequently received inputs in sequence in the manner illustrated below in Table B which illustrates the codes produced by the encoder means 34 for the sample account number here being considered.

TABLE B

| Digit Position | Decimal Digit Value | Binary Code Produced |
|---|---|---|
| 1 | 0 | 0000 |
| 2 | 4 | 0100 |
| 3 | 0 | 0000 |
| 4 | 4 | 0100 |
| 5 | 3 | 0011 |
| 6 | 7 | 0111 |
| 7 | 8 | 1000 |
| 8 | 7 | 0111 |
| 9 | 7 | 0111 |
| 10 | 0 | 0000 |

Thus, as each input representing a digit of the credit card account number is applied at the seller's keyboard 8, the encoder means 34 will produce a four bit binary code representative thereof and apply such four bit binary code in parallel to the security code generator means 6 through conductors 36 and 38.

The input from the encoder means 34 which is applied to the security generator means 6 through conductor 36 is relied upon to logically indicate in the security code generator means 6 the digit position of the account number presently being read in so that the presence of data representing digit positions of the account number with which the security code information is associated, as specified by the credit card issuer, may be determined. This function is here achieved by the action of the card digit counter means 42 and the binary to decimal decoder means 44. The card digit counter means 42, as described above, may comprise a four bit binary counter which acts in the conventional manner to count each input bit applied thereto and produce an output for each four bits received. The card digit counter means 42 thereby produces one pulse at the output thereof for each output of the encoder means 34 representing a digit position of the credit card account number and thus for instance, the first output pulse produced by the card digit counter is indicative that the first digit position of the account number has been read in, the fourth output pulse produced by the card digit counter is indicative that the fourth digit position of the credit card account number has been read in while the 10th output pulse produced by the card digit counter is indicative that the 10the digit position of the credit card account number has been read in and hence the input of the account number sequence is completed. The output pulse produced by the card digit counter means 42 upon the receipt of each four inputs thereto is applied to the binary to decimal decoder means 44 while an output indicating that the 10th group of four bit inputs have been counted and hence that the input sequence has been completed is applied via conductor 62 to the encoder means 34 for further application to the output conductor 40.

The binary to decimal decoder means 44 is a single input, 10 output device which acts, as aforesaid, to enable one of the discrete outputs thereof for each input received and each of the ten discrete outputs thereof is associated with a particular digit position of the credit card account number. The binary to decimal decoder means 44 thus acts to provide a decimal indication of the number of four bit binary code inputs received by the security code generator 6 and hence a decimal indication of the account number digit position information presently being applied to the security code generator means 6 by enabling one of the 10 distinct outputs thereof for each input pulse that is received. For instance, if the ten outputs of the binary to decimal decoder means 44 are considered to be arbitrarily assigned numbers 1-10 corresponding to the ten digit positions of the account number, when the first input pulse is received from the card digit counter means 42, the output 1 is enabled, when the fifth input pulse is received outputs 1-5 are enabled and when the tenth input is received outputs 1-10 are enabled to thereby indicate that the input sequence has been completed. Therefore, although the end of sequence signal produced on conductor 62 is indicated as originating at the card digit counter means 42, it will be appreciated that such signal could be readily developed at the binary to decimal decoder means 44 by an additional connection to the 10th output thereof. The outputs produced by the binary to decimal decoder means 44 are applied in parallel through cable 64 to the card digit select patch means 56.

Upon the depression of the American Express Company key at the card type select portion 8'' of the seller's keyboard 8, an appropriate signal for enabling the printed circuits associated with the American Express Company will be applied through conductor 66 to the card digit select patch means 56, the memory field select patch means 58 and the bit select patch means 60. The operation of each of the elements within code patch panel means 30 will be described individually below; however, the various modes of code generation selected by the credit card issuer must here be specified to establish a fixed set of operating conditions. Thus, for the purposes of the instant disclosure, it will be assumed that the American Express Company has designated that the first, second, fifth and ninth digits of the account number of each of their credit cards is to be used for the derivation of the security code; that the derivation for the first, second, fifth and ninth digits should take place in memory fields 1, 2, 3 and 4, respectively; that the security code should be derived from the fourth through eighth and 12th through 16th bits of the 16 available bits and that the order of the 10 digits used from the sixteen available bits shall not be permuted or otherwise scrambled, but that they be utilized in the order in which they are received. The foregoing set of initial conditions assumed above were selected for their relative simplicity but it will be appreciated that each condition selected may be altered at will to vary the manner in which the security code is derived.

Under the set of security code derivation conditions set forth above, the gating circuits within the card digit select patch means 56 enabled by the printed circuit module associated with the American Express Company will be such that when the first input in cable 64 is enabled a positive output will be produced; when the first and second inputs in cable 64 are enabled a negative output will be produced; when the first through fifth inputs in cable 64 are enabled a positive output will be produced and when the first through ninth inputs in cable 64 are enabled a negative output will be produced. However, when any of the inputs 1-3, 1-4, 1-6, 1-7, 1-8 and 1-10 in cable 6 are enabled, no output will be produced by the card digit select patch means 56. Accordingly, as will be apparent to those of ordinary skill in the art, the card digit select patch means 56 will only produce an appropriately directed output signal during time intervals which correspond to the output at the encoder means 34 of binary information associated with the digit positions of the credit card account number from which the security code is to be derived.

As each appropriately directed output signal is produced by the card digit select patch means 56, the output signal produced is applied to the memory field select patch 58 through the conductor 70 and to the data clock means 52 and register control means 54 through conductor 68. Under the conditions specified above, the memory field select patch means 58 has its gating circuits enabled by the printed circuit associated with the American Express Company so that a positive output is produced in response to each of the first and second inputs received from conductor 70, while a negative output is produced in response to each of the third and fourth inputs applied thereto by conductor 70. The thus properly timed and directed outputs produced by the memory field select patch means 58 are applied to the data multiplex means 48 through conductor 78 so that, as shall be seen hereinafter, data from fields 1 and 2 will be selected during the first and second readout intervals of the read only memory means 46 while data from fields 3 and 4 is selected during the third and fourth readout intervals of the read only memory means 46. Similarly, the data clock means 52 will, as aforesaid, respond to positive or negative input signals applied thereto from the card digit select patch means 56 to produce positive or negative, respectively, read pulses which are applied to the read only memory means 46 wherein positive read pulses enable the reading of addressed columns 1-10 in fields 1 and 3, as may be seen in Table A, while negative read pulses enable the reading of addressed columns 11-20 in fields 2 and 4. Thus, the data clock means 52 will apply properly directed read pulses to the read only memory means 46 at time intervals which correspond to the production at the encoder means 34 of binary information representing digit positions in the credit card account number which have security code information associated therewith.

The register control means 54 is, as aforesaid, responsive to each input signal applied thereto from the card digit select patch means 56, through conductor 68, to enable one of four distinct outputs therefrom. Each of the four outputs of the register control means 54 is coupled through cable 77 to one of the four storage registers present within the register means 50 and acts in the previously specified manner to allow information which is applied to each of such four registers from the data multiplex means 48 to be written into the register which is thereby enabled. Thus, the register means 50 is in receipt of properly timed enabling signals from the register control means 54 which act to selectively enable one of the four bit registers therein so that such register may accept and store a four bit character applied thereto from the data multiplex means 48.

As was previously described above, digit information from each digit position is sequentially applied to the encoder means 34 from the seller's keyboard 8 and such digit information is encoded into a four bit binary code which is applied through conductor 38 as an address input to the read only memory means 46. As will be recalled from the above, the manner in which the read only memory means 46 is addressed is conventional and addresses have been assumed to have been assigned in a straight forward manner such that one column common to fields 1 and 3 and one column common to fields 2 and 4 is addressed based upon an assignment order wherein the column number numerically corresponds to the digit value of the encoded information as indicated in Table A. Therefore, referring to Table A, which appears on page 29 of this specification, it will be seen that as the credit card account number 040–437–877–0 is applied in sequence to the encoder means 34, the encoder means 34 will apply a four bit binary code in parallel to conductor 38 for each digit of such account number so that columns 1 and 11, 5 and 15, 1 and 11, 5 and 15, 4 and 14, 8 and 18, 9 and 19, 8 and 18, 8 and 18 and 1 and 11 therein are addressed in sequence. Furthermore, as the security code information as designated by the credit card issuer here being discussed is associated with the first, second, fifth and ninth digit positions of the account number, as aforesaid, a positive read pulse will be applied to the read only memory means 46 by the data clock means 52 during the intervals that columns 1 and 11 and 4 and 14 are addressed for the first and fifth digit positions, respectively, while a negative read pulse will be applied to the read only memory means 46 by the data clock means 52 during the intervals that columns 5 and 15 and 8 and 18 are addressed for the second and ninth digit positions of the account number, respectively, due to the previously described action of the card digit counter means 42, the binary to decimal decoder means 44 and the card digit select patch means 56. Therefore, as a positive pulse applied to the read only memory means 46 will cause an addressed one of columns 1–10 to be read, while a negative pulse applied to the read only memory means 46 will cause an addressed one of columns 11–20 to be nondestructively read; it will be seen that columns 1, 15, 4 and 18, as shown in Table A will be read from the read only memory means 46 in a sequence corresponding to the sequence in which digit information representing digit positions associated with the security code is applied to the encoder means 34. However, as the data clock means 52 does not apply read pulses to the read only memory means 46 during such times as columns associated with digit values in the third, fourth, sixth, seventh, eighth and tenth digit positions of the account number are addressed, these columns will not, under the conditions specified above, be read out.

Referring again to Table A, it will be seen that when column 1 is nondestructively read out from the read only memory means 46, the eight bit binary code 00100101 will be applied in parallel through cable 76 to the data multiplex means 48 wherein the first four bits thereof, i.e., 0010, are from field 1 while the second four bits therein, i.e., 0101, are associated with field 3. The data multiplex means 48 acts in accordance with a control signal, as aforesaid, to apply either the top or bottom four bits applied thereto to the register means 50 while the remaining four bits are discarded. In the instant case, the memory field select patch means 58 applies, in the manner described above, a positive pulse to the data multiplex means 48 wherein such positive pulse is timed to coincide with the readout of the first digit position of the account number which here corresponds to column 1. Therefore, as a positive pulse selects the top four bits or the field 1 information, the first four bits 0010 are applied in parallel to the register means 50 while the bottom four bits 0101 are discarded. Thus, security code information associated with the first digit position of the credit card account number has been developed from the first field of the read only memory means 46 and applied in parallel to the register means 50. The four parallel bits 0010 thus applied to the register means 50 will be simultaneously applied to the inputs of each of the four, four bit registers present therein; however, as only the inputs of the first register are enabled at this time by the register control means 54, due to the action of the first pulse supplied through conductor 68 by the card digit select patch means 56, such four bits will be stored, under the conditions set forth above, in the first four bit register of the register means 50. Accordingly, it will be seen that the binary code sequence 0010 derived from field 1 and associated with the first digit position of the credit card account number is stored in parallel in the first four bit register present within the register means 50.

In a similar manner which may be seen upon a further inspection of Table A, when column 15 of the read only memory 46 is read out, the eight bit binary code 00011000 will be applied in parallel to the data multiplex means 48 wherein the first four bits, i.e., 0001, originated in field 2 and the second four bits, i.e., 1000, originated in field 4. As the data multiplex means 48 is again in receipt of a positive pulse from the memory field select patch means 58, the data multiplex means 48 will apply the top four bits 0001 in parallel to the register means 50 while the bottom four bits 1000 are discarded. During this interval, the second four bit register within the register means 50 is enabled and the four bit code 0001 is rewritten in parallel thereinto. Thus, at this time the first four bit register within the register means 50 contains 0010 while second four bit register therein contains the bits 0001 wherein the four bit code 0001 was derived from field 2 of the read only memory 46 and is associated with the second digit position of the account number.

Thereafter, when columns 4 and 18 of the read only memory means 46 are read out, the eight bit sequences 10001100 and 10100101, as may be seen in Table A, will be applied, respectively, in parallel to the data multiplex means 48. At the time the eight bit sequence 10001100 is applied to the data multiplex means 48, a negative pulse will be applied thereto by the memory field select patch means 58 while the third four bit register in the register means 50 will be enabled by the register control means 54. Therefore, the bottom four bits of the sequence 100001100 will be applied by the data multiplex means 48 to the register means 50 so that the third four bit register therein will have the binary code 1100 written in parallel therein wherein the binary code 1100 was developed from field 3 of the read only memory means 46 and is associated with the fifth digit position of the credit card account number. Similarly, at the time the eight bit sequence 10100101 is applied to the data multiplex means 48, a negative pulse is applied thereto by the memory field select patch means 58 while the fourth four bit register in the register means 50 is enabled by the register control means 54. Therefore, the bottom four bits of the sequence 10100101 will be applied by the data multiplex means 48 to the register means 50 so that the fourth four bit register therein will have the binary code 0101 written in parallel thereinto wherein the binary code 0101 was developed from field 4 of the read only memory means 46 and is associated with the ninth digit position of the credit card account number. Thus, it will be seen that the register means 50 has the sixteen bit code 0010 0001 1100 0101 stored in parallel therein, wherein each four bit group is associated with one of the four digit positions of the account number which contains security code information and is related to the value of such digit position. Furthermore, as specified by the credit card issuer, the 16 bits developed thus far are associated with the first, second, fifth and ninth digit positions of the credit card and the four, four bit codes assembled into the 16 bit sequence were developed from memory fields 1-4, respectively. The 16 bit code thus present in the register means 50 is applied in parallel to the bit select patch means 60 through the cable 78.

The bit select patch means 60 acts in the previously described manner to accept the sixteen bits applied in parallel thereto through conductor 78 and apply ten of such bits in a preselected order to the 10 outputs thereof. As was set out above, it is assumed for the purposes of this disclosure that the instant credit card issuer has selected that the security code is to be derived from the fourth through eighth and 12th through 16th bits of the 16 available bits and that the order of the 10 digits used from the sixteen available shall not be permuted or otherwise scrambled but that they be utilized in the order in which they are received. Accordingly, the printed circuit selected in the bit select patch means 60 by the application of an American Express Company input thereto on conductor 66 will enable a gating tree arrangement in the bit select patch means 60 which passes the fourth through eighth and 12th through 16th input bits received thereby directly to the ten outputs thereof without any change in the order therein while the first through third and ninth through eleventh input bits received are not further applied to the 10 outputs of the bit select patch means 60. Thus, of the 16 input bit sequence 0010 0001 1100 0101 applied in parallel to the input of the bit select patch 60, the first three bits 001 and the ninth through 11th bits 110 are stripped while the fourth through eighth and 12th through 16th bits 00001 and 00101, respectively, are applied in parallel, without reordering, to the outputs of the bit select patch means 60. Thus, under the exemplary conditions specified above, the 10 bit sequence 00001 00101 is developed at the bit select patch means 60 and applied in parallel, through cable 80, to the second input of the comparator means 82.

As the second input to the comparator means 82 receives the 10 bit binary code 00001 00101 in parallel from the bit select patch 60 through cable 80, while the depression of the keys AE at the card holder keyboard 2 resulted, it will be recalled, in the application of the 10 bit binary code 00001 00101 in parallel from the encoder means 32, through cable 86, to the first input of the comparator means 82; the comparator means 82 will receive identical signals at each of the inputs thereto. Therefore, the comparator means 82 will indicate that an identity exists between the security code applied at the card holder keyboard 2 and the security code associated with the particular type of credit card by the production of a One level output on conductor 88. The One level output thus produced under these circumstances by the comparator means 82 is applied to enable logic means 84 which, when enabled, responds to a One level input to energize conductor 92 and hence the pass indicia. As the enable input $C_1$ to the enable logic means 84 is in receipt of the output of the encoder means 32, through cable 86, the enable logic means 84, under the conditions set forth above, will energize the pass indicia when the second enable input $C_2$ receives an input. The second enable input $C_2$ to the enable logic means 84 is applied, as aforesaid, from the encoder means 34 through conductor 40 at the completion of the input at the seller's keyboard 8. Thus, at the completion of the encoding of the ten digit account number of the credit card presented in the foregoing exemplary case, the pass indicia will be energized indicating that the presentor of such exemplary credit card is an authorized holder thereof and that the credit transaction may proceed either through a further check of the individual's credit through a data link to a control processor or by directly utilizing the credit card presented for charging. Of course, in the above example if any other combination of alphanumerics other than AE had been applied to the card holder keyboard, the comparator means 82 would have produced a Zero output whereby the reject indicia would have been energized indicating that the credit card presented should not be accepted.

Thus, it is seen that the instant invention provides methods and apparatus for validating the identity of the bearer of a credit card or the like which are completely compatible with conventional credit card formats having no special encoding of identifying codes thereon. Furthermore, the instant invention allows wide and independent variation in the techniques relied upon in the derivation of a security code from the account number of credit cards issued by each credit card company because each credit card issuer may arbitrarily and independently change the security codes associated with his cards without issuing new credit cards. For instance, merely by changing the printed circuit module in the card digit select patch means 56 associated with his company, a credit card issuer may selectively change any or all of the digit positions of his account number from which the security code is derived and/or change the memory field with respect to columns 1-10 or 11-20 from which the derivation of the security code for any one or all of the digit positions takes place and this change is accomplished without affecting the mode of derivation selected by another credit card issuer. Similarly, by changing a printed circuit module within the memory field select patch means 58, a credit card issuer may selectively change the memory field with respect to rows 1–4 or 5–8 relied upon in the derivation of the security code for any one or all of the selected digit positions of the credit card account number and these changes are also accomplished without affecting the mode of derivation selected by another credit card issuer. Additionally, by changing a printed circuit module within the bit select patch means 60, a credit card issuer may independently choose any 10 of 16 binary bits to be utilized in the final steps of deriving the security codes associated with his credit cards and in addition thereto the order in which the selected 10 bits are produced to form the binary representation of the security code may be varied and such variations are independent of the modes selected by other credit card issuers. Thus, any credit card issuer using the instant invention has available to him such a multitude of variations in the manner in which his security codes are derived that he is virtually assured of the security of the techniques selected for the derivation of his codes as well as his ability to continuously vary the code deriving techniques employed so that security is maintained.

Although the embodiment of this invention illustrated in FIG. 3 has been disclosed in great detail so as to acquaint the reader of this specification with each of the many attributes thereof, many alterations and variations of the basic invention set forth will occur to those of ordinary skill in the art. For instance, any of the encoding techniques or binary codes relied upon herein may be varied to accommodate smaller or larger systems and of course any logic circuitry specified herein may be modified or changed in favor of other logical arrangements calculated to achieve the same result or a slightly varied result directed to the same purpose. Additionally, as will be apparent to those of ordinary skill in the art, any function ascribed herein to any given block within the security code generator means 6 or the code patch panel 30 may be combined with the functions performed by other elements or where more than one function is performed by a given element such function may alternatively be performed in combination with another element. Furthermore, the storage locations used in the read only memory means 46 may be varied to accommodate either smaller or larger systems and unused storage may be appropriated for other data functions not associated with the instant invention. In addition, it will be appreciated that this invention is not limited to credit situations but may be relied upon in any access, security or other situation wherein a card or other means having a viewable or machine readable number sequence thereon may be presented by a bearer. Further, although the instant invention was disclosed in conjunction with apparatus usable with cards issued by several issuers, the invention may be used for only a single issuer by using only a single printed circuit module within the code patch panel 30.

While the invention has been described in connection with a single exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. Card verifier apparatus for validating cards having a plural digit identifying number thereon and an independent security code logically derivable therefrom comprising:

comparison means for accepting first and second input signals and providing an indication as to the existence of an identity between said first and second input signals;

first input means for receiving a security code and applying signals representative thereof to said comparison means as said first input signals therefor;

second input means for receiving a plural digit identifying number on a card to be validated and producing input signals representative of each digit of said plural digit identifying number on said card to be validated;

security code generator means responsive to selected ones of said input signals produced by said second input means for logically deriving and generating output signals representing a security code from the numerical value of digits in designated digit positions in said plural digit identifying number, said selected ones of said input signals being representative of the numerical value of said digits in said designated digit positions in said plural digit identifying number; and means for applying said output signals representing a security code logically derivable from the numerical value of digits in said designated digit positions in said plural digit identifying number to said comparison means as said second input signals thereto.

2. The card verifier apparatus according to claim 1 wherein said first input means for receiving a security code and applying signals representative thereof to said comparison means as said first input signals therefor comprises card holder keyboard means coupled to encoder means, said card holder keyboard means being adapted to mechanically receive said security code by the depression of appropriate ones of the keys thereon and to produce an output in response to each key depressed, said encoder means being responsive to each output produced by said card holder keyboard means to produce a digital code therefor which is applied to said comparison means.

3. The card verifier apparatus according to claim 2 wherein said security code comprises a plurality of alphanumeric characters, said encoder means being responsive to each output produced by said card holder keyboard means representing one of said alphanumeric characters to produce a multi-bit binary code associated therewith, each bit of said multi-bit binary code produced for each of said plurality of alphanumeric characters in a given security code being applied in parallel to said comparison means as said first input signals therefor.

4. The card verifier apparatus according to claim 1 wherein said second input means for receiving a plural digit identifying number on a card to be validated and producing input signals representative of each digit of said plural digit identifying number on said card to be validated comprises digit value sequency means, and identifying number encoder means, said digit value sequence means being adapted to receive said plural digit identifying number and produce a plurality of outputs in sequence therefrom, each output in said sequence representing in value the value of a digit in a corresponding digit position in said plural digit identifying number, said identifying number encoder means responsive to each of said plurality of outputs in sequence to produce a digital code therefor which is applied as said input signals to said security code generator means.

5. The card verifier apparatus according to claim 4 wherein said identifying number encoder means is responsive to each of said plurality of outputs in sequence to produce a multi-bit multi-bit code group therefor, each multi-bit binary code group being applied to said security code generator means in a sequence corresponding to said sequence in which said plurality of outputs are produced by said digit value sequence means, each multi-bit binary code group being representative of said value of the digit in said corresponding digit position in said plural identifying number.

6. The card verifier apparatus according to claim 4 wherein said digit value sequence means comprises seller's keyboard means.

7. The card verifier apparatus according to claim 4 wherein said digit value sequence means comprises card reader means.

8. Card verifier apparatus for validating cards having a plural digit identifying number thereon and an independent security code assigned thereto and derivable from said plural digit identifying number comprising:
comparison means for accepting first and second input signals and providing an indication as to the existence of an identity between said first second second input signals;
first input means for receiving a security code and applying signals representative thereof to said comparison means means as said first input signals therefor;
second input means for receiving a plural digit identifying number on a card to be validated and producing input signals representative of each digit of said plural digit identifying number on said card to be validated;
security code generator means responsive to selected ones of said input signals produced by said second input means for generating output signals representing a security code derivable from designated digit positions in said plural digit identifying number, said selected ones of said input signals being representative of the value of said digits in said designated digit positions in said plural digit identifying number, said security code generator means including;
counting means for counting each of said input signals produced by said second input means and producing an output indicative of the state of the count,
means responsive to said counting means for producing a read signal each time the state of the count reaches one of several predetermined levels,
memory means having at least one multi-bit character associated with each digit value which may be present in a given plural digit identifying number and including address means responsive to each input signal produced by said second input means to address the multi-bit character associated therewith,
means for applying each read signal to said memory means whereupon an addressed multi-bit character will be read therefrom each time the state of the count reaches said one of several predetermined levels, and
means for applying preselected bits of the multi-bit characters read from said memory means to said means for applying output signals representing a security code derivable from designated digit positions in said plural digit identifying number to said comparison means as said second input signals thereto; and
means for applying said output signals representing a security code derivable from designated digit positions in said plural digit identifying number to said comparison means as said second input signals thereto.

9. The card verifier apparatus according to claim 1 additionally comprising third input means for receiving an indication as to which one of a a plurality of types of cards said plural digit identifying number is associated with, said means responsive to said counting means for producing a read signal each time said state of the reaches reaches one of several predetermined levels including a plurality of selectable gating circuit means, each of said selectable gating circuit means being associated with one of said plurality of types of cards and determining said several predetermined levels, said means responsive to said counting means further including means responsive to said third input means for enabling one of said plurality of selectable gating circuit means in accordance with which one of said plurality of types of cards said plural digit identifying number is associated with.

10. The card verifier apparatus according to claim 8 additionally comprising third input means for receiving an indication as to which one of a plurality of types of cards said plural digit identifying number is associated with, said means for applying preselected bits of said multi-bit characters read from said memory means including buffer means for storing each multi-bit character read from said memory means for a given plural digit identifying number and a plurality of selectable gating means, each of said selectable gating means being associated with one of said plurality of types of cards and determinative of which of said preselected bits of said multi-bit characters read from said memory means and stored in said buffer means are applied to said means for applying output signals representing a security code associated with designated digit positions in said plural digit identifying number to said comparison means as second input signals thereto, said means for applying preselected bits of said multi-bit characters read from said memory means further including means responsive to said third input means for enabling one of said plurality of selectable gating means in accordance with which one of said plurality of types of cards said plural digit identifying number is associated with.

11. The card verifier apparatus according to claim 10 wherein each of said plurality of selectable gating means is further determinative of the order in which said preselected bits of said multi-bit characters read from said memory means and stored in said buffer means are applied to said means for applying output signals representing a security code associated with designated digit positions in said plural digit identifying number to said comparison means as said second input signals thereto.

12. The card verifier apparatus according to claim 1 wherein said memory means includes a plurality of multi-bit characters associated with each digit valve which may be present in a given plural digit identifying number and said address means is responsive to each input signal produced by said second input means to address each of said plurality of multi-bit characters associated therewith, said card verifier apparatus additionally comprising third input means for receiving an indication as to which one of a plurality of types of cards said plural digit identifying number is associated with, and means for selecting only one multi-bit character from said plurality of multi-bit characters associated with each digit which may be present in a given plural digit identifying number for application to said means for applying preselected bit upon the application of a read signal to said memory means, said means for selecting including a plurality of selectable gate circuit means, at least one of said plurality of selectable gate circuit means being associated with each one of said plurality of types of cards and determinative of the one multi-bit character to be applied to said means for applying preselected bits upon the application of a read signal to said memory means, said means for selecting further including means responsive to said third input means for enabling one of said plurality of selectable gate circuit means in accordance with which one of said plurality of types of cards said plural digit identifying number is associated with.

13. The card verifier apparatus according to claim 1 wherein said first input means for receiving a security code and applying signals representative thereof to said comparison means as said first input signals therefor comprises card holder keyboard means coupled to encoder means, said card holder keyboard means being adapted to mechanically receive said security code by the depression of appropriate ones of the keys thereon and to produce an output in response to each key depressed, said encoder means responsive to each output produced by said card holder keyboard means to produce a digital code therefor which is applied to said comparison.

14. The card verifier apparatus according to claim 13 wherein said second input means for receiving a plural digit identifying number on a card to be validated and producing input signals representative of each digit of said plural digit identifying number on said card to be validated comprises digit value sequence means and identifying number encoder means, said digit value sequence means being adapted to receive said plural digit identifying number and produce a plurality of outputs in sequence therefrom, each output in said sequence representing in value the value of a digit in a corresponding digit position in said plural digit identifying number, said identifying number encoder means responsive to each of said plurality of outputs in sequence to produce a digital code therefor which is applied as said input signals to said security code generator means.

15. The card verifier apparatus according to claim 14 additionally comprising third input means for receiving an indication as to which one of a plurality of types of cards said plural digit identifying number is associated with, said means responsive to said counting means for producing a read signal each time said state of the count reaches one of several predetermined levels including a plurality of selectable gating circuit means, each of said selectable gating circuit means being associated with one of said plurality of types of cards and determining said several predetermined levels therefor, said means responsive to said counting means further including means responsive to said third input means for enabling one of said plurality of selectable gating circuit means in accordance with which one of said plurality of types of cards said plural digit identifying number is associated with.

16. The card verifier apparatus including according to claim 15 wherein said means for applying preselected bits of said multi-bit characters read from said memory means includes buffer means for storing each multi-bit character read from said memory means for a given plural digit identifying number and a plurality of selectable gating means, each of said selectable gating means being associated with one of said plurality of types of cards and determinative of which of said preselected bits of said multi-bit characters read from said memory means and stored in said buffer means which are applied to said means for applying output signals representing a security code associated with designated digit positions in said plural digit identifying number to said comparison means as said second input signals thereto, said means for applying preselected bits of said multi-bit characters read from said memory means further including means responsive to said third input means for enabling one of said plurality of selectable gating means in accordance with which one of said types of cards said plural digit identifying number is associated with.

17. The card verifier apparatus according to claim 16 wherein said memory means includes a plurality of multi-bit characters associated with each digit value which may be present in a given plural digit identifying number and said address means is responsive to each input signal produced by said second input means to address each of said plurality of multi-bit characters associated therewith, said card verifier apparatus additionally comprising means for selecting only one multi-bit character from said plurality of multi-bit characters associated with each digit value which may be present in a given plural digit identifying number for application to said means for applying preselected bits upon the application of a read signal to said memory means, said means for selecting including a plurality of selectable gate circuit means, at least one of said plurality of selectable gate circuit means being associated with each one of said plurality of types of cards and determinative of said one multi-bit character to be applied to said means for applying preselected bits upon the application of a read signal to said memory means, said means for selecting further including means responsive to said third input means for enabling one of said plurality of selectable gate circuit means in accordance with which one of said plurality of types of cards said plural digit identifying number is associated with.

18. The card verifier apparatus according to claim 17 wherein said security code comprises a plurality of alphanumeric characters, said encoder means being responsive to each output produced by said card holder keyboard means representing one of said alphanumeric characters to produce a multi-bit binary code associated therewith, each bit of said multi-bit binary code produced for each of said plurality of alphanumeric characters in a given security code being applied in parallel to said comparison means as said first input signals therefor.

19. The card verifier apparatus according to claim 18 wherein said identifying number encoder means is responsive to each of said plurality of outputs in sequence to produce a multi-bit binary code group therefor, each multi-bit binary code group being applied to said security code generator means in a sequence corresponding to said sequence in which said plurality of outputs are produced by said digit value sequence means, each multi-bit binary code group being representative of said value of the digit in said corresponding digit position in said plural digit identifying number.

20. The card verifier apparatus according to claim 19 wherein each of said plurality of selectable gating means is further determinative of the order in which said preselected bits of said multi-bit characters read from said memory means and stored in said buffer means are applied to said means for applying output signals representing a security code associated with designated digit positions in said plural digit identifying number to said comparison means as said second input signals thereto.

21. The card verifier apparatus according to claim 20 wherein said digit value sequence means comprises seller's keyboard means.

22. The card verifier apparatus according to claim 21 wherein said third input means is present on said seller's keyboard means.

23. A method for verifying the authority of card holders in possession of cards having a plural digit identifying number thereon and an independent security code logically derivable therefrom comprising the steps of:
providing input means for receiving a security code assigned to a given card from the holder thereof;
encoding the security code received into a binary code representative of said security code;
applying the plural digit identifying number on said given card to security generator means as a sequence of input signals, each input signal in said sequence representing the numerical value of a corresponding one of the digits in said plural digit identifying number;
selecting predetermined ones of said input signals in said sequence and generating a multi-bit binary code group from each of said input signals selected;
assembling designated bits from selected multi-bit binary code groups into a multi-bit code; and
comparing said binary code representing said security code with said multi-bit code and providing an indication as to whether an identity therebetween is present.

* * * * *